(12) United States Patent
Rochat et al.

(10) Patent No.: US 8,077,414 B2
(45) Date of Patent: Dec. 13, 2011

(54) SYSTEM AND METHOD FOR ANALYZING MAGNETIC MEDIA SURFACES FOR THERMAL ERASURES AND OTHER CHARACTERISTICS

(75) Inventors: Daniel D. Rochat, Ogden, UT (US); Ryan Osterhout, Roy, UT (US)

(73) Assignee: EMC Corporation, Hopkinton, MA (US)

( * ) Notice: Subject to any disclaimer, the term of this patent is extended or adjusted under 35 U.S.C. 154(b) by 719 days.

(21) Appl. No.: 12/242,483

(22) Filed: Sep. 30, 2008

(65) Prior Publication Data

US 2010/0080101 A1    Apr. 1, 2010

(51) Int. Cl.
*G11B 5/02*    (2006.01)
*G11B 27/36*    (2006.01)
(52) U.S. Cl. ............................................. 360/25; 360/31
(58) Field of Classification Search .................. None
See application file for complete search history.

(56) References Cited

U.S. PATENT DOCUMENTS 6,266,199 B1 * 7/2001 Gillis et al. ...................... 360/31
2005/0052768 A1 * 3/2005 Yeo et al. ......................... 360/31

* cited by examiner

*Primary Examiner* — Daniell L Negron
*Assistant Examiner* — Regina N Holder
(74) *Attorney, Agent, or Firm* — Stephen C. Beuerle; Procopio Cory Hargreaves & Savitch LLP

(57) ABSTRACT

Analyzing magnetic media surfaces for thermal erasures and other characteristics is described. The system includes a drive channel module configured to measure servo automatic gain control values for a magnetic media surface that represent the amount of gain applied by the drive channel module to a preamble signal recorded on the magnetic media surface. The gain control values are then acquired according to certain measurement parameters. The gain control values are then arranged by proximity to each other and organized to generate images that represent changes in the characteristics of the magnetic media surface. Analysis of the images then detects patterns that represent changes in the characteristics of the media surface and determines measurement parameters that coincide with the change in the characteristic.

33 Claims, 6 Drawing Sheets

SYSTEM AND METHOD FOR ANALYZING MAGNETIC MEDIA SURFACES FOR THERMAL ERASURES AND OTHER CHARACTERISTICS

FIELD OF THE INVENTION

This invention relates to computer storage products, and more particularly to analyzing magnetic media surfaces for thermal erasures and other characteristics.

BACKGROUND

In general, after manufacture, the platters of a hard disk drive need to be tested for defects and to ensure that they meet specifications. Testing is typically performed on unformatted disk platters prior to final disk drive assembly. Small scratches, pits and other defects in the surface of the magnetic film are particularly critical and the existence of any such defects needs to be identified. By identifying the location of spatial defects, data loss is avoided by marking the area as defective prior to use, or by discarding the disk entirely if it is found to have too many defects.

In addition to spatial defects such as scratches or other irregularities in the disk surface, hard disks are also subject to "thermal" defects that may occur along with or separately from the spatial defects. Magnetic media storage devices such as hard disk drives suffer from recorded signal damage when a particle trapped under the read/write head of the hard disk drive causes enough friction to create a thermal event that changes the magnetic state of the of the recorded signal. For example, this type of defect is essentially a small bump or protrusion on the surface of the platter, including the surfaces of the hard disk, where the height of the bump is such that the read or write head makes contact with the bump, but is able to continue scanning the surface of the disk (i.e., the bump is not so large that the read head stops functioning). When the read head encounters the bump, the high speed impact causes the read head to increase in temperature (hence the name "thermal" defect). Repeated impacts lead to wear on the read head and can eventually cause the head to "crash" into the surface of the hard disk. As such, thermal defects on a hard disk pose an even greater problem than spatial ones. While spatial defects may limit the amount of disk space available to store data, thermal defects may cause the hard disk to crash, such that data on the disk may or may not be recoverable. For this reason, a disk having predominantly spatial defects and few thermal ones will be more usable than a disk having the same total number of defects, but where a substantial number of the defects are thermal.

Accordingly, there is a need for a system and method to identify spatial and thermal defects and other defective characteristics on a magnetic media surface and to distinguish each type of defect from the other.

SUMMARY

Described herein is a magnetic media drive for analyzing magnetic media surfaces for thermal erasures and other characteristics is described. The magnetic media drive includes a drive channel module to measure gain control values for a magnetic media surface. The magnetic media surface includes multiple positions where each position has a servo wedge on which servo samples are recorded. The servo samples include a preamble signal that is recorded on servo tracks of the magnetic media surface. The gain control values represent the amount of gain applied by the drive channel module to the preamble signal to acquire a desired amplitude. The gain control values can be servo gain control values or recorded data gain control values. The gain control values can also be recorded automatically. The magnetic media drive also includes an acquisition module that is in communication with the drive channel module. The acquisition module receives a request for measurement of gain control values for the magnetic media surface according to one or more measurement parameters. The measurement parameters indicate the scope of the measurement of the gain control values. The request including the measurement parameters can be received from a host device such as a personal computer and can be specified by a user of the host device. The acquisition module acquires the gain control values according to the measurement parameters. In one embodiment, the one or more measurement parameters include a geographic location on the magnetic media surface for which the measurement is required. The geographic location can be defined by multiple positions on the magnetic media surface.

The magnetic media drive can also include a configuration module to arrange the acquired gain control values in accordance with their proximity to each other and to organize the gain control values to generate one or more images that represents or emphasize changes in the characteristics of the magnetic media surface. In some embodiments, the magnetic media drive includes an analysis module to analyze the one or more images to detect patterns in the one or more images that represent a change in the characteristic of the magnetic media surface. The analysis module also analyzes the patterns to determine measurement values that coincide with the change in the characteristic of the magnetic media surface. The measurement values are then utilized to determine the root cause of the change in the characteristics of the magnetic media surface.

In one embodiment, a method for analyzing magnetic media surfaces for thermal erasures and other characteristics includes measuring gain control values for a magnetic media surface. The magnetic media surface includes multiple positions where each position includes a servo wedge on which servo samples can be recorded. The servo samples include a preamble signal that is recorded on servo tracks of the magnetic media surface. The gain control values represent the amount of gain applied by the drive channel module to the preamble signal to acquire a desired amplitude. The method also includes receiving a request for measurement of gain control values for a magnetic media surface according to one or more measurement parameters. The one or more measurement parameters indicate the scope of the measurement of the gain control values. The measurement parameters can be received from a user device and specified by a user. The measurement parameter can include a geographic location on the magnetic media surface and can be defined by multiple positions on the magnetic media surface. The gain control values are then acquired according to the measurement parameters. In one embodiment, the acquired gain control values are arranged in accordance with their proximity to each other and organized to generate one or more images that represent or emphasize changes in the characteristics of the magnetic media surface. The one or more images are then analyzed to detect patterns in the one or more images that represent at least a change in a characteristic of the magnetic media surface. The method further includes analyzing the patterns to determine a measurement values that coincide with the change in the characteristic of the magnetic media surface. The measurement values can be utilized for detecting the root cause of the change in the characteristic of the magnetic media surface in order to implement a cause of action to address the change in the characteristic.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

After reading this description it will become apparent to one skilled in the art how to implement the invention in various alternative embodiments and alternative applications. However, although various embodiments will be described herein, it is understood that these embodiments are presented by way of example only, and not limitation. As such, this detailed description of various alternative embodiments should not be construed to limit the scope or breadth of the present invention as set forth in the appended claims.

Figure 1:
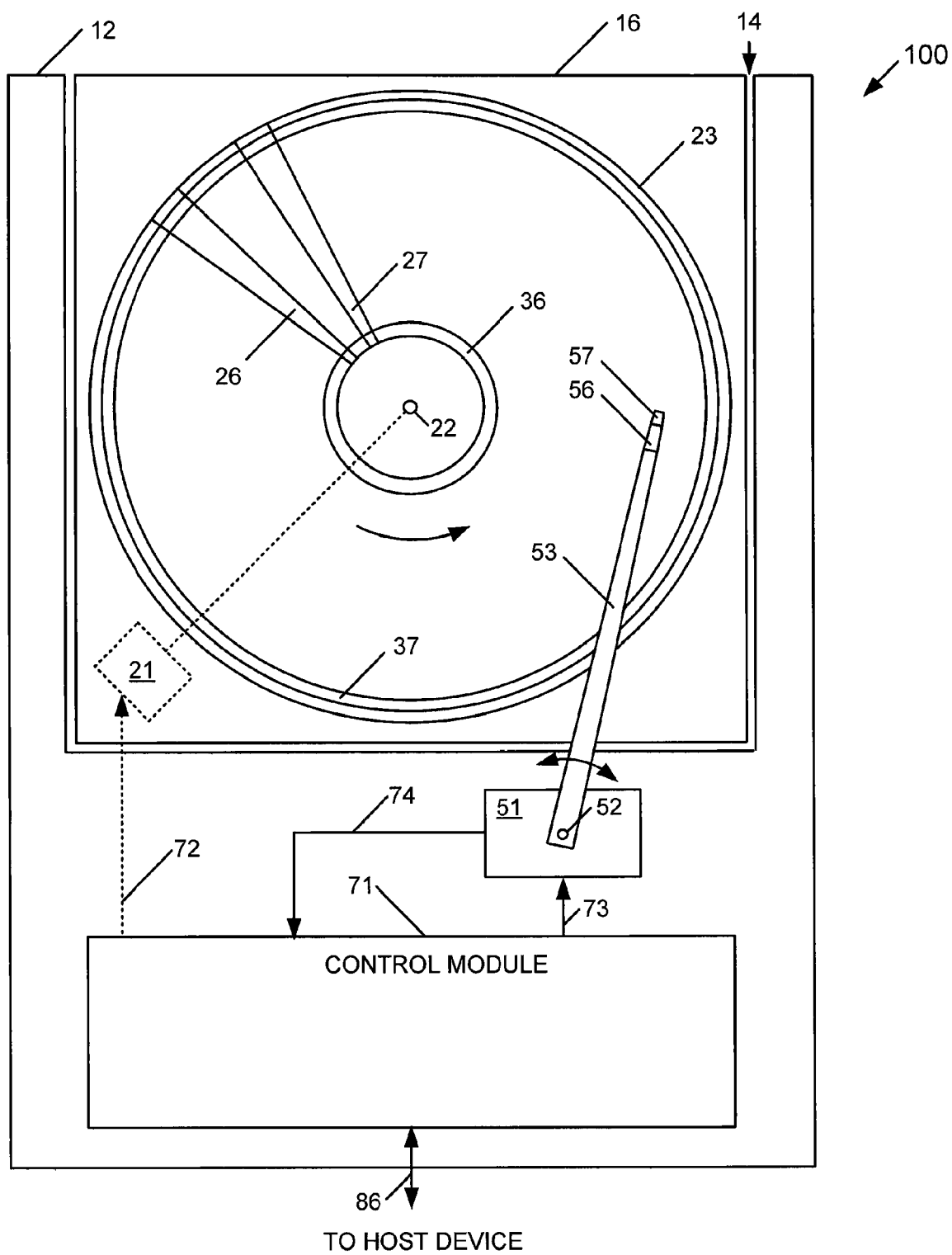
FIG. 1 is a diagrammatic view of an apparatus which is an information storage system, according to an embodiment.

FIG. 1 is a diagrammatic view of an apparatus which is an information storage system 10, and which embodies aspects of the present invention. In one embodiment, information storage system 10 can be a magnetic media drive. The system 10 includes a receiving unit or drive 12 which has a recess 14, and includes a cartridge 16 which can be removably inserted into the recess 14. In some embodiments, the cartridge 16 includes 216 servo wedges or points per rotation and 190,000 tracks per magnetic media surface.

The cartridge 16 has a housing, and has within the housing a motor 21 with a rotatable shaft 22. A disk 23, is fixedly mounted on the shaft 22 for rotation therewith. The surface of the disk 23 in FIG. 1 can be coated with a magnetic material, and serves as an information storage medium. This surface may be referred to as a magnetic media surface. This disk surface or magnetic media surface is conceptually divided into a plurality of concentric data tracks. In some embodiment, there are about 50,000 data tracks, not all of which are available for use in storing user data.

The disk surface is also conceptually configured to have a plurality of circumferentially spaced sectors, two of which are shown diagrammatically at 26 and 27. These sectors are sometimes referred to as servo wedges. The portions of the data tracks which fall within these sectors or servo wedges are not used to store data. Data is stored in the portions of the data tracks which are located between the servo wedges. The servo wedges are used to store servo information of a type which is known in the art. The servo information in the servo wedges conceptually defines a plurality of concentric servo tracks, which have a smaller width or pitch than the data tracks. In one embodiment, each servo track has a pitch or width that is approximately two-thirds of the pitch or width of a data track. In other embodiments, a disk 23 has about 73,000 servo tracks. The servo tracks effectively define the positions of the data tracks, in a manner known in the art.

Data tracks are arranged in a concentric manner ranging from the radially innermost tracks 36 to the radially outermost tracks 37. User data is stored in the many data tracks that are disposed from the innermost tracks 36 to the outermost tracks 37 (except in the regions of the servo wedges).

The drive 12 includes an actuator 51 of a known type, such as a voice coil motor (VCM). The actuator 51 can effect limited pivotal movement of a pivot 52. An actuator arm 53 has one end fixedly secured to the pivot 52, and extends radially outwardly from the pivot 52. The housing of the cartridge 16 has an opening in one side thereof. When the cartridge 16 is removably disposed within the drive 12, the arm 53 extends through the opening in the housing, and into the interior of the cartridge 16. At the outer end of the arm 53 is a suspension 56 of a known type, which supports a read/write head 57. In one embodiment, the head 57 is a giant magneto-resistive (GMR) head. In other embodiments, the head 57 is a magneto-resistive (MR) head.

During normal operation, the head 57 is disposed adjacent the magnetic surface on the disk 23, and pivotal movement of the arm 53 causes the head 57 to move approximately radially with respect to the disk 23, within a range which includes the innermost tracks 36 and the outermost tracks 37. When the disk 23 is rotating at a normal operational speed, the rotation of the disk induces the formation between the disk surface and the head 57 of an air cushion, which is commonly known as an air bearing. Consequently, the head 57 floats on the air bearing while reading and writing information to and from the disk, without direct physical contact with the disk. The distance the head floats above the disk is known as the "fly-height."

The drive 12 includes a control module 71, which is operationally coupled to the motor 21 in the cartridge 16, as shown diagrammatically at 72. The control module 71 selectively supplies power to the motor 21 and, when the motor 21 is receiving power, the motor 21 effects rotation of the disk 23. The control module 71 also provides control signals at 73 to the actuator 51, in order to control the pivotal position of the arm 53. At 74, the control module 71 receives an output signal from the head 57, which is commonly known as a channel signal. The output signal received by the head is a measure of the servo samples which can include signals recorded on the servo wedge that make up the servo information. The servo samples include a preamble signal that is recorded on servo tracks of the magnetic media surface. A preamble signal is a signal that is not amplified with a gain value or factor, for example. When the disk 23 is rotating, segments of servo information and data will alternately move past the head 57, and the channel signal at 74 will thus include alternating segments or bursts of servo information and data.

The control module 71 of the drive 12 is coupled through a host interface 86 to a not-illustrated host device, for example a host computer. The host computer can send user data to the drive 12, which the drive 12 then stores on the disk 23 of the cartridge 16. The host computer can also request that the drive 12 read specified user data back from the disk 23, and the drive 12 then reads the specified user data and sends it to the host computer. In some embodiments, the host interface 86 conforms to an industry standard protocol which is commonly known as the Universal Serial Bus (USB) protocol, but could alternatively conform to any other suitable protocol, including but not limited to the IEEE 1394 protocol.

As the heads 57 get dirty, the fly height decreases. The decrease in the fly height increases the friction between the heads 57 and the disk 23, which causes the slider to get off-track, thus increasing the PES. Therefore, monitoring the PES can be used to indicate a change in the fly height.

Figure 2:
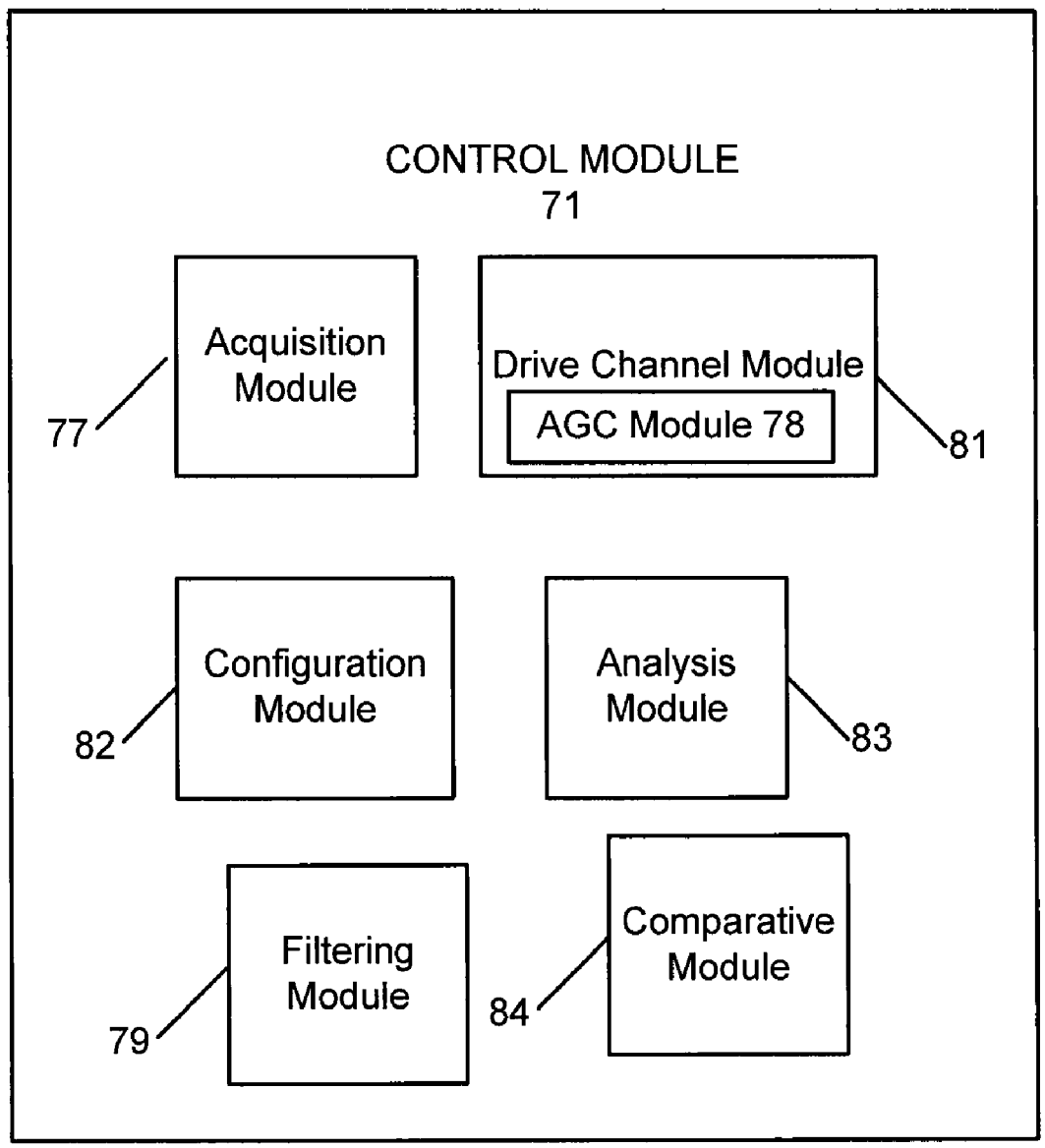
FIG. 2 is a block diagram illustrating an example control module for the apparatus illustrated in FIG. 1 according to an embodiment.

FIG. 2 is a block diagram illustrating an example control module for the apparatus illustrated in FIG. 1 above according to an embodiment. The control module can include a drive channel module 81, an acquisition module 77, a configuration module 82 and an analysis module 83.

The drive channel module 81 measures the quality or amplitude of the samples of the magnetic media surface. The samples can be servo samples or data samples recorded on the magnetic media surface. The servo samples can be recorded during the manufacturing process of the hard disk. In one embodiment, the quality of the samples of the magnetic media surface is a measurement that the channel provides. It indicates the amount of error the sampled waveform shape has compared to an ideal waveform. The magnetic media surface having multiple positions where each position includes a servo wedge on which servo samples are written. A servo sample includes a preamble signal that is recorded on servo tracks of the magnetic media surface. The servo preamble is a tone written prior to the positioning information. It is used to get the channel in sync or locked up prior to the Gray code and burst information. It is during the preamble that the channel adjusts the amplitude. In one embodiment, the drive channel module applies gain to the preamble signal to generate gain control values. The drive channel module 81 can apply gain values automatically to obtain automatic gain control values. The automatic gain control values represent the amount of gain applied by the drive channel module to the preamble signal to acquire a desired amplitude. In one embodiment, the drive channel module can be a drive channel circuit with a channel resolution of 0.1 dB per count. In other embodiments, the drive channel module 81 includes an automatic gain control (AGC) circuit or module 78. The AGC circuit 78 effect variation, in a known manner, of a gain factor that influences the amplitude of the channel signal 74. In particular, the AGC module 78 uses a higher gain factor when the amplitude of the channel signal 74 is low, and uses a lower gain factor when the amplitude of the channel signal 74 is high. Consequently, the amplitude of the channel signal has less variation at the output of the AGC module 78 than at the input thereof.

The acquisition module 77 is in communication with the drive channel module 81 and acquires automatic gain control values from the drive channel module 81. One way of acquiring these values is by reading the values from the drive channel module 81. In one embodiment, the acquisition module can be an independent firmware or a set of commands added to a drive firmware of the drive 12 that allows a host device, for example, to collect automatic gain control values for a range of positions on the magnetic media surface. In one embodiment, the acquisition module 77 receives a request for measurement of automatic gain control values from a host device, for example a personal computer. The request can be specified by the user of the host device. In other embodiments the request for measurement can be random and can be initiated at the control module 71. The host device can request automatic gain control measurements in according to one or more measurement parameters indicating the scope of the measurement on the magnetic media surface. The measurement parameters can include, for example, beginning and ending positions on the magnetic media surface and a step size. In one embodiment, to speed the data collection part, measurements can be made every 100 tracks or every 2000 tracks or using some other increment as the step size. The acquisition module acquires the gain control values according to the measurement parameters. In one embodiment, acquisition module 77 also reports the acquired automatic gain control values to the host device. In other embodiments, the acquisition module 77 sums multiple samples of measurement (e.g. 10) of each servo wedge in each position requested and report the result to the host device. Summing multiple samples of measurements of each servo wedge improves the resolution of the drive channel module.

Figure 3:
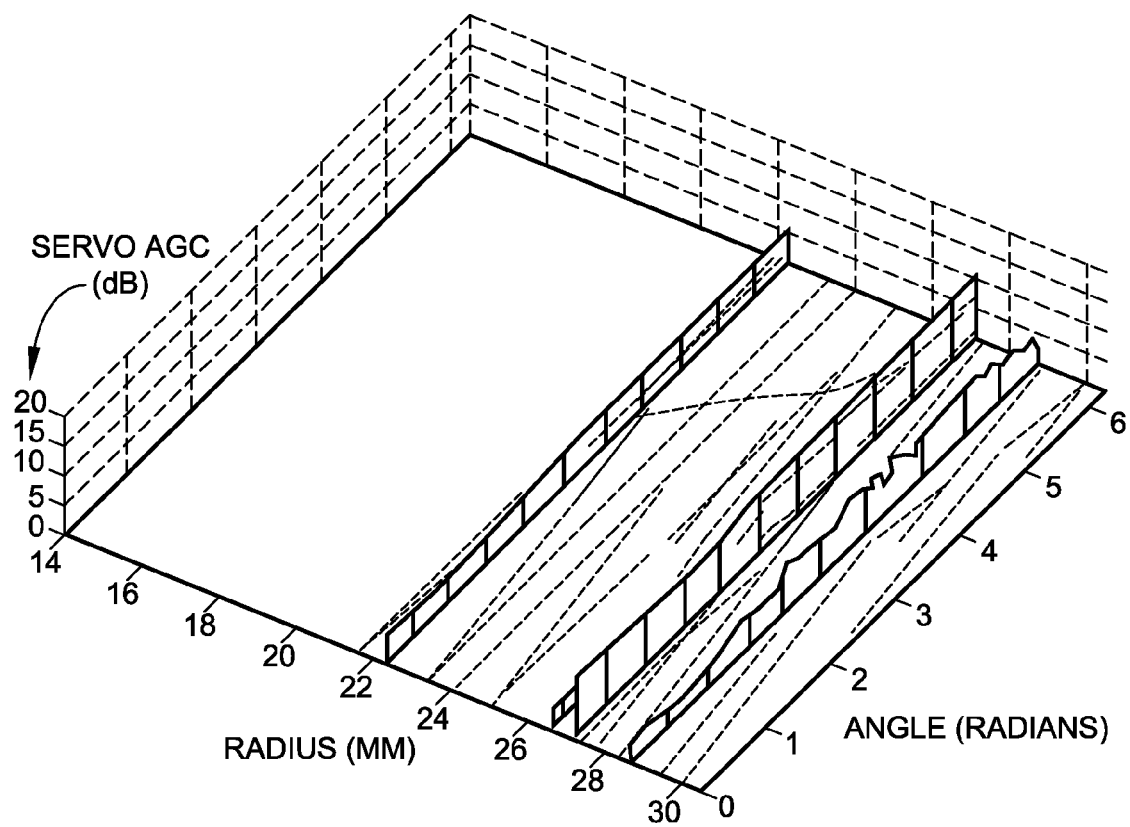
FIG. 3 illustrates an example mesh plot of gain control values representing a section of the magnetic media surface according to an embodiment.

The configuration module 82 arranges the acquired measurements of the gain control values into a spatial configuration in accordance with their proximity to each other. In one embodiment each of the measurements represents a servo position and a servo wedge. For example, each servo sample which includes the preamble signals recorded on the servo wedge represents a servo position and a servo wedge. The gain control values can also be acquired for data positions on the magnetic media in a similar manner as that acquired for the servo positions and servo wedges. In one embodiment, the data fields also include a preamble which measurement is also available from the channel. It is a bit more difficult to do the spatial configuration because there are various numbers of data sectors per track. The servo position represents the physical radius of the sample. The wedge number represents the rotational position of the sample. These positions are relative to the known radius of the starting track and the known track pitch. In some embodiments, the cartridge 16 includes 216 servo wedges or points per rotation and 190,000 tracks per magnetic media surface. All disk files require some means of determining the radial position of the read-write heads over the disks so that the heads can be accurately positioned over any desired track. Typically this is done by putting servo information or samples on one or more of the disk surfaces for reading by magnetic or optical read heads. The physical radius can be measured in millimeters while the angular position is measured in radians. The configuration module also organizes the spatially configured automatic gain control values to generate one or more images that represent the layout of the magnetic media surface according to the measurement parameters as illustrated in FIG. 3 below. The configuration module 82 is configured to represent or emphasize or enhance the change in the characteristics of the magnetic media surfaces illustrated in the one or more generated images. One or more software tools, for example MATLAB, can used to plot the gain control values into a mesh plot that enhances subtle differences in the signal amplitude as illustrated in FIG. 3 below. In one embodiment, the one or more software tools, example MATLAB, is used to convert the raw measurements of the gain control values, contained in a binary file, for example, to a bitmap (BMP) lossless bitmap image that can be manipulated. The MATLAB scripts are used to construct a header portion of the BMP file, arrange the measurements spatially and map the values of the measurements to a color space, for example. In one embodiment the automatic gain control values can be mapped to various colors to further enhance the change in characteristics of the magnetic media surfaces. In one embodiment, the scripts of the one or more software tools can be incorporated into a filter module 79 and can be used to perform filtering of the one or more images. Formats other than the BMP format can be used to generate the one or more images of the magnetic media surface in accordance with the gain control values. Common image editing tools such as Irfanview and Photoshop can be used to manipulate the one or more images.

The analysis module 83 analyzes the one or more images to detect patterns in the one or more images that represent at least a change in a characteristic of the magnetic media surface. The analysis module further analyzes the patterns to determine measurement values that coincide with the change in the characteristic of the magnetic media surface. The measurement values including the starting position, ending position and peak velocity of a seek event, position of the head when the event occurred, velocity of the head when the event occurred can be determined from the one or more images.

Magnetic media storage devices such as hard disk drives suffer from recorded signal damage when a particle trapped under the head causes enough friction to create a thermal event that changes the magnetic state (characteristic) of the recorded signal. The change in characteristics of the magnetic media surface may be a magnetic media damage, thermal erasure etc. Magnetic media damage is permanent while thermal erasure is non-permanent. Thermal erasure of written data on disks is one of the major file failure mechanisms, especially for disks using glass substrates due to their poor thermal conductivity. Most of the thermal erasure events are due to head disk contact. The one or more images can be analyzed for thermal erasures and other media characteristics. In some embodiments, analyzing the one or more images include comparing a current image of the one or more images with a prior image to identify a change in the pattern of the current image with respect to that of the prior image. This comparison functions can be implemented in a comparative module 84 that may be incorporated in the analysis module 83 or independent of the analysis module 83. The comparative module 84 may also be independent of the control module 71 but in communication with the control module 71 to receives the gain control values from the control module 71. The one or more images can be consolidated to a numeric parameter, for example a single or a few numbers, which can be compared to a corresponding numeric parameter of a threshold image. The comparison can be implemented in accordance with a test script associated with the comparative module 84 and the result stored in a storage device (for example a database) for future reference. One method of filtering is to sum each pixel's difference from the mean of its surrounding pixels. One method of consolidating to a single number is to look at the maximum or sum of all pixels after the filter is applied. This method of generating a single quantity can be accomplished by post processing the test script in accordance with one or more software tool such as MATLAB or by using a histogram feature available in common image editing software applications. In other embodiments, the analysis module 83 subtracts the change in the pattern of a first image from the change in pattern of a second image to determine a metric to track changes to the magnetic media surface such as an incremental change in the image pattern that represent at least a change in the characteristics of the magnetic media surface. A first image representing a portion of the magnetic media surface can be generated at the start of a test for, for example, and measured periodically throughout the test period to observe incremental changes in the magnetic media surface. The two images can be subtracted, pixel by pixel, to generate a new image that reveals the incremental damage or defect in the surface of the magnetic media surface represented by the consequent change in characteristic of the magnetic media surface. The first and second image represents an image based on the automatic gain control values of a similar geographic location on the magnetic media surface acquired at different moments in time. The geographic location can be specified by at least some of the multiple positions of the magnetic media surface.

In other embodiments, the analysis module 83 analyzes the one or more images to identify a change in the pattern of the current image with respect to that of a threshold representation that is reduced to an image for display image (hereinafter described as threshold image). The threshold image can be a predetermined image or a prior image corresponding to the automatic gain control values of the magnetic media surface. The analysis module can also analyze the one or more images to identify other measurement values used to track changes to the magnetic media surface including the rate of change in the characteristics of the current image. In addition, the analysis module 83 analyzes the one or more images to detect patterns in the one or more images that reveal measurement values related to the head velocity and position of the head when the change in at least a characteristic of the magnetic media surface occurred. In one embodiment, the shape of the artifact in the image is used to characterize what the heads were doing when the event occurred.

The measurement values obtained from the image can be used to determine the root cause of the change in the characteristic of the magnetic media surface that indicate thermal erasure or other characteristics. An appropriate cause of action can be implemented to address thermal erasure or other defects due to other characteristics. In one embodiment, a responsive action is performed including generating an error condition when the change in the characteristics of the magnetic media surface exceeds a threshold. An example responsive action includes marking the geographic location where the change in characteristic occurred as defective prior to use, or discarding the hard disk entirely if the change in the characteristic exceeds a maximum threshold. Another responsive action can include rewriting the recorded signal to the magnetic media surface. The error condition can be due to a particle trapped under the head that causes enough friction to create a thermal event, for example, that changes the characteristic or magnetic state of the recorded signal. The measurement values acquired from the one or more image analysis can be used to determine the circumstances under which the thermal event occurred. For example, the measurement parameters can be used to determine when the article was trapped under the head and what caused the particle to be trapped under the head.

The change in the characteristic of the one or more images correspond to changes in the gain control values of the magnetic media surface due to thermal erasures. In addition to thermal erasures, other media characteristics may be analyzed including magnetic grain orientation, media flatness and media clamping distortions. In one embodiment, grain orientation is when the magnetic particles have a long axis. When the bits are recorded in this access, the recording is stronger than when they are recorded in the short access. This would show up in the image as a "1f" pattern. "1f" refers to 1 cycle per rotation. Additionally, media flatness and clamping distortion affect the head fly height. Typically, the amplitude increases as the fly height decreases. In some embodiments, elements of a servo track writer performance can be measured including track to track coherency y timing errors, servo preamble erase band caused by the erase band of the servo track writer head and dynamic fly height zone settings. In one embodiment, the track to track coherency errors cause signal cancellation and thus lower amplitude. Preamble erase bands are a thin boarder between the tracks where the recording is erased. The amount of the erase band varies head to head. The one or more images generated can be used to qualify servo track writer performance by qualifying erase bands and adjacent track coherence.

In some embodiments, drive 12, for example magnetic media drive, includes a filter module 79 to filter the image generated to enhance subtle differences in the automatic gain control values that are used to generate the one or more image. In one embodiment, the filter module 79 includes an image editing software with filtering capability to enhance the various subtle aspects of the image that may be normally unapparent. Examples of filtering techniques used in accordance with the filter module 79 include edge detection and median filtering. Edge detecting an image significantly reduces the amount of data and filters out useless information, while preserving the important structural properties in an image. In image processing it is usually necessary to perform high degree of noise reduction in an image before performing higher-level processing steps, such as edge detection. The median filter is a non-linear digital filtering technique, often used to remove noise from images or other signals. The images can be easily cropped, resized, etc., for identification of thermal erasures and other characteristics.

In other embodiments, the one or more images generated as described above can be used as a water mark, for example, to be utilized as a unique disk identifier or media fingerprint that uniquely identifies the media. The unique disk identifier or media fingerprint can be useful for applications such as the security or digital rights management. In other embodiments, a message such as a serial number or encryption key can be embedded into the media by overwriting or degrading some servo fields or samples in the servo tracks.

FIG. 3 illustrates an example mesh plot of gain control values representing a section of the magnetic media surface according to an embodiment. For explanatory purpose the mesh plot of FIG. 3 will be described with respect to FIGS. 1 and 2 above. In this embodiment the x-axis represents the rotational position in radians relative to the index wedge, the y-axis represents a physical radius of the magnetic media surface relative to the spindle center and the z-axis represents the gain control values in dB. Each servo sample which includes signals recorded on the servo wedge represents a servo position and a servo wedge. The servo position represents the physical radius of the servo wedge. When converted to millimeters, it is relative to the spindle center. The servo wedge represents the angular position. In this embodiment, the physical radius is measured in millimeters while the angular position is measured in radians. One or more software tools, for example MATLAB, can used to plot the gain control values into a mesh plot that enhances subtle differences in the signal amplitude as illustrated in FIG. 1. FIG. 3 shows a mesh plot of a disk that had several thermal erasure events. There sloped lines that start at the OD of the surface (right hand side) and proceed toward the ID of the surface as the rotational position increase (bottom towards top). These lines for example represent a head load (constant velocity moving off the load ramp).

Figure 4:
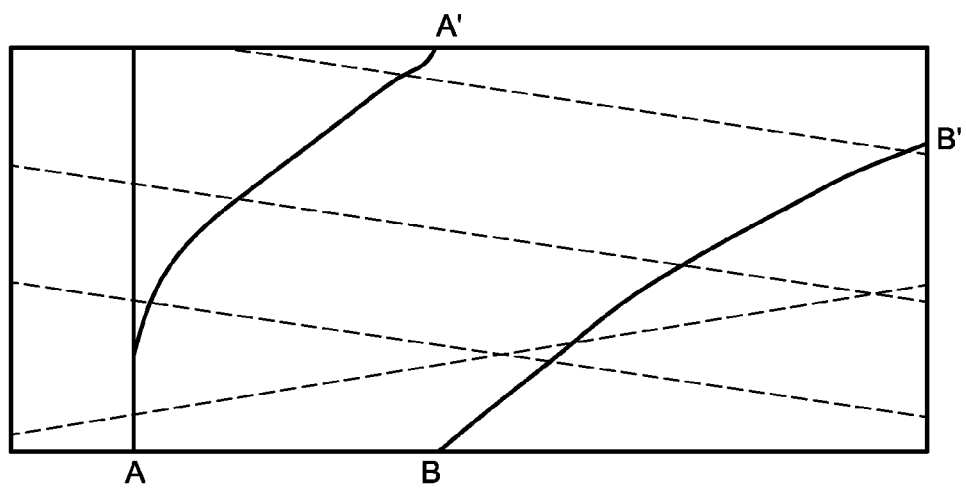
FIG. 4 illustrates an example representation of a portion of the magnetic media surface highlighting a change in the characteristic of the magnetic media surface according to an embodiment.

FIG. 4 illustrates an example representation of a portion of the magnetic media surface highlighting a change in the characteristic of the magnetic media surface according to an embodiment. For explanatory purpose the generated image will be described with respect to FIGS. 1 and 2 above. The magnetic media surface of FIG. 4 illustrates a single seek event represented by the lines A-A' and B-B' (A' and B are about the same point, B is just one sample later in the rotational position). Note that a circular track is represented in this figure by a vertical line. The track wraps from the top of the plot to the bottom of the plot. This seek starts at A, accelerates to A' where it continues at point B an then on to point B'. The seek event represents a change in the characteristic of the magnetic media surface caused by thermal erasures. Measurement values such as the starting position, ending position and peak velocity of a seek event, position of the head when the event occurred, velocity of the head when the event occurred can be determined from the image because we observe the position within the image and we know how fast the spindle is rotating, we know the velocity. The measurement values obtained from the image can be used to determine the root cause of the change in the characteristic of the magnetic media surface that indicate thermal erasure or other characteristics. An appropriate cause of action can be implemented to address thermal erasure or other defects due to other characteristics. In one embodiment, a responsive action is performed including generating an error condition when the change in the characteristics of the magnetic media surface exceeds a threshold. An example responsive action includes marking the geographic location where the change in characteristic occurred as defective prior to use, or discarding the hard disk entirely if the change in the characteristic exceeds a maximum threshold. In one embodiment, the information for post analysis of cartridges from a test that tends to generate internal debris is used. The information could be used to know when to retire a contaminated cartridge prior to data loss. Other measurement values can be deciphered from the generated image including head load and unload, head biased against the inside crash top, seek settles and track following. In one embodiment, head unload are the lines that head off of the surface in the same image. A head biased against the inside crash stop appears as damage around the entire radius at the very ID. Seek accelerate and coast is shown in Figure. The beginning of that settle can be seen in FIG. 3 but the finish is hidden behind the large damage seen at about 27 mm.

Figure 5:
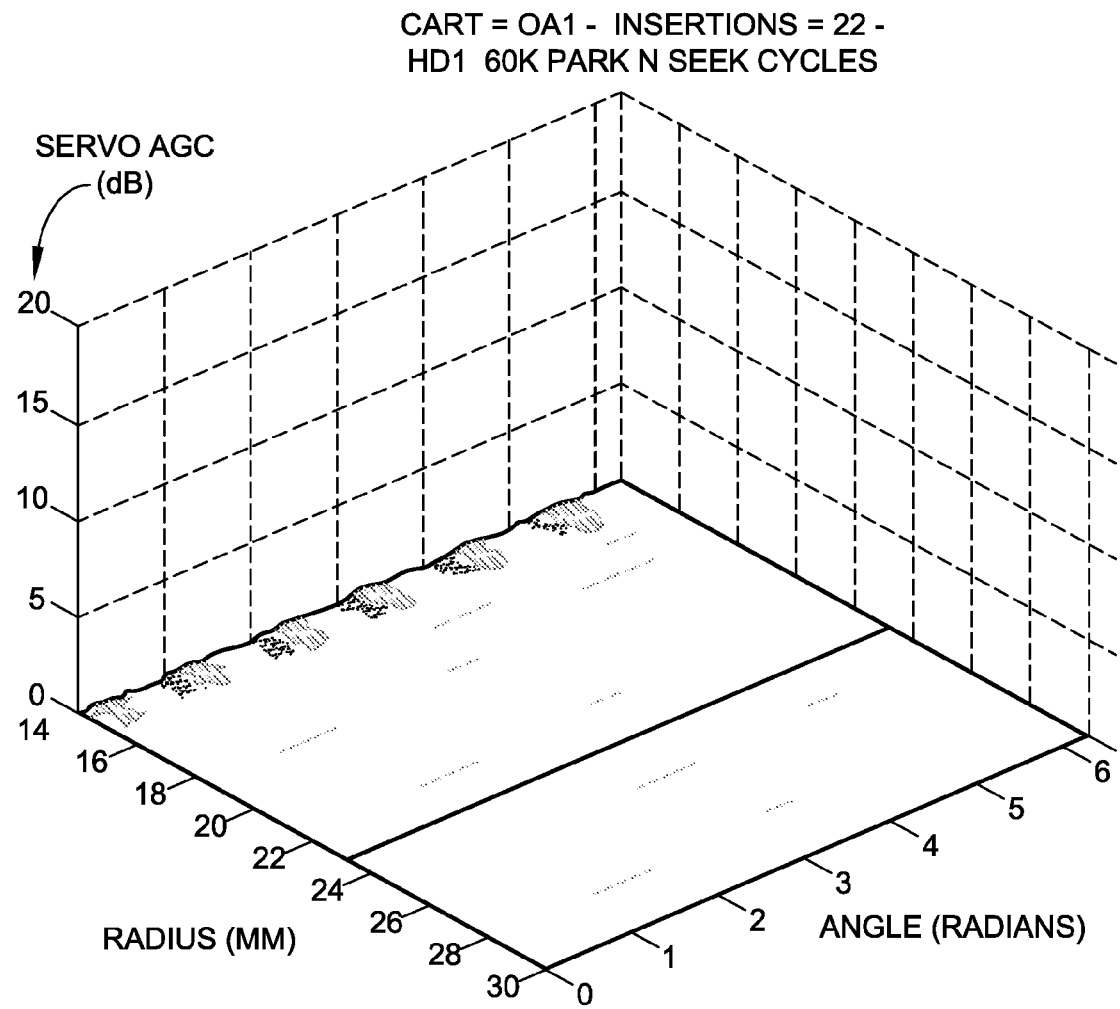
FIG. 5 illustrates one example of a graph identifying a media clamping distortion of a generated image according to an embodiment.

FIG. 5 illustrates one example of a graph identifying a media clamping distortion of a generated image according to an embodiment. For explanatory purpose the graph will be described with respect to FIGS. 1 and 2 above. In this embodiment the x-axis represents the rotational position in radians, the y-axis represents a physical radius of the sampled servo wedge relative to the spindle center and the z-axis (labeled servo AGC (dB)) represents the automatic gain control in decibels. The image in the graph illustrates clamping distortion between the physical radius values of 14 millimeters and 15 millimeters. The clamping distortions have been enhanced by the generated image according to the description of FIG. 2 above. A clamping distortion occurs when the magnetic media surface buckles under pressure or from heat expansion due to, for example, a particle trapped between the clamp and the glass or uneven torque applied to the clamp. As the head rotates over the magnetic media surface and reads the recorded signals, the gain control values in the areas suffering from clamping distortion are significantly changed. These changes in the automatic gain control are illustrated in FIG. 3 within the physical radius values of 14 millimeters and 15 millimeters. In some embodiments, the clamping distortions are high enough to create contact with the head and subsequently cause damage to the head.

Figure 6:
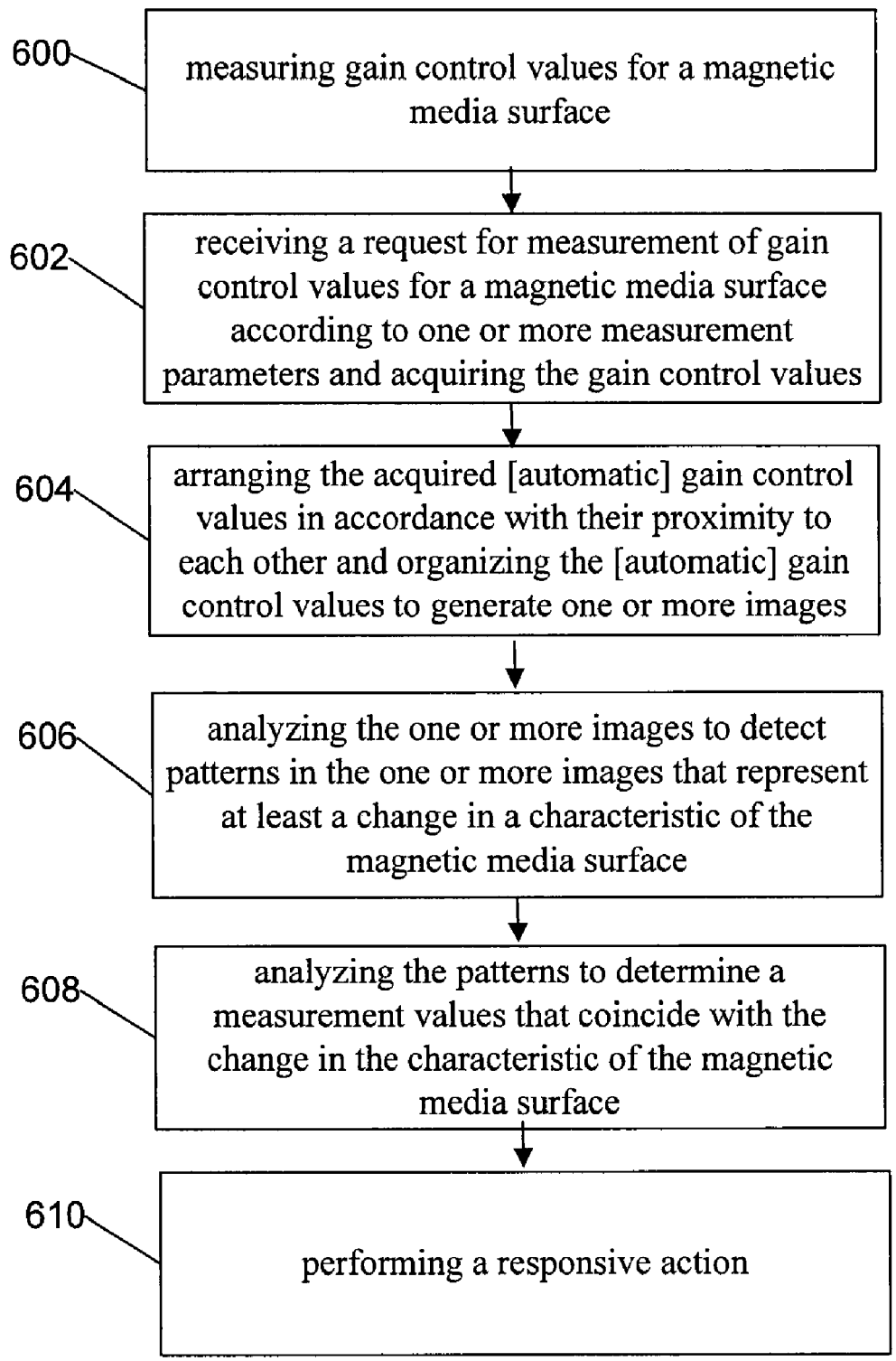
FIG. 6 is a flowchart of an example method for analyzing magnetic media surfaces for thermal erasures and other characteristics according to an embodiment.

FIG. 6 is a flowchart of an example method for analyzing magnetic media surfaces for thermal erasures and other characteristics according to an embodiment. The steps of this process may be implemented in the control module 71 of FIG. 1.

At step 600 the process starts with measuring automatic gain control values for a magnetic media surface. The magnetic media surface includes multiple positions where each position has a servo wedge on which servo samples are recorded. A servo sample can include a preamble signal that is recorded on servo tracks of the magnetic media surface. The gain control values represent the amount of gain applied by the drive channel module 81 to the preamble signal to acquire a desired amplitude.

The process then continues to step 602, where a request for measurement of gain control values for a magnetic media surface according to one or more measurement parameters is received. The measurement parameters indicate the scope of the measurement of the gain control values on the magnetic media surface. In one embodiment, the gain control values are acquired or read from the drive channel module 81 that is configured to measure the automatic gain control values. The measurement parameters can include a geographic location on the magnetic media surface for which the measurement is required. A geographic location can be specified by multiple positions, a radius and a rotational angle or position on the magnetic media surface.

In step 604, the acquired gain control values are arranged in accordance with their proximity to each other and organized to generate one or more images that emphasize changes in the characteristics of the magnetic media surface. In step 606, the one or more images are analyzed to detect patterns in the one or more images that represent at least a change in a characteristic of the magnetic media surface. The process then continues to step 608 where the one or more images are analyzed to determine measurement values that coincide with the change in the characteristic of the magnetic media surface. The measurement values utilized for detecting the root cause of the change in the characteristic of the magnetic media surface. Finally in step 610, a responsive action is performed including generating an error condition when the change in the characteristics of the magnetic media surface exceeds a threshold.

In some embodiments, the one or more images generated can be filtered to enhance subtle differences in the gain control values that are used to generate the one or more image. Also a comparison of a current image of the one or more images with a prior image representing the same geographic location on the magnetic media surface as the current image can be made to identify a change in the pattern of the current image with respect to that of the prior image. If the change in pattern exceeds a threshold value a responsive action including generating an error condition can be performed. In other embodiments, the change in the pattern of a first image can be subtracted from the change in pattern of a second image to determine an incremental change in the image pattern. The first and second image can be acquired at different moments in time and represent an image based on the gain control values of a similar geographic location on the magnetic media surface.

Figure 7:
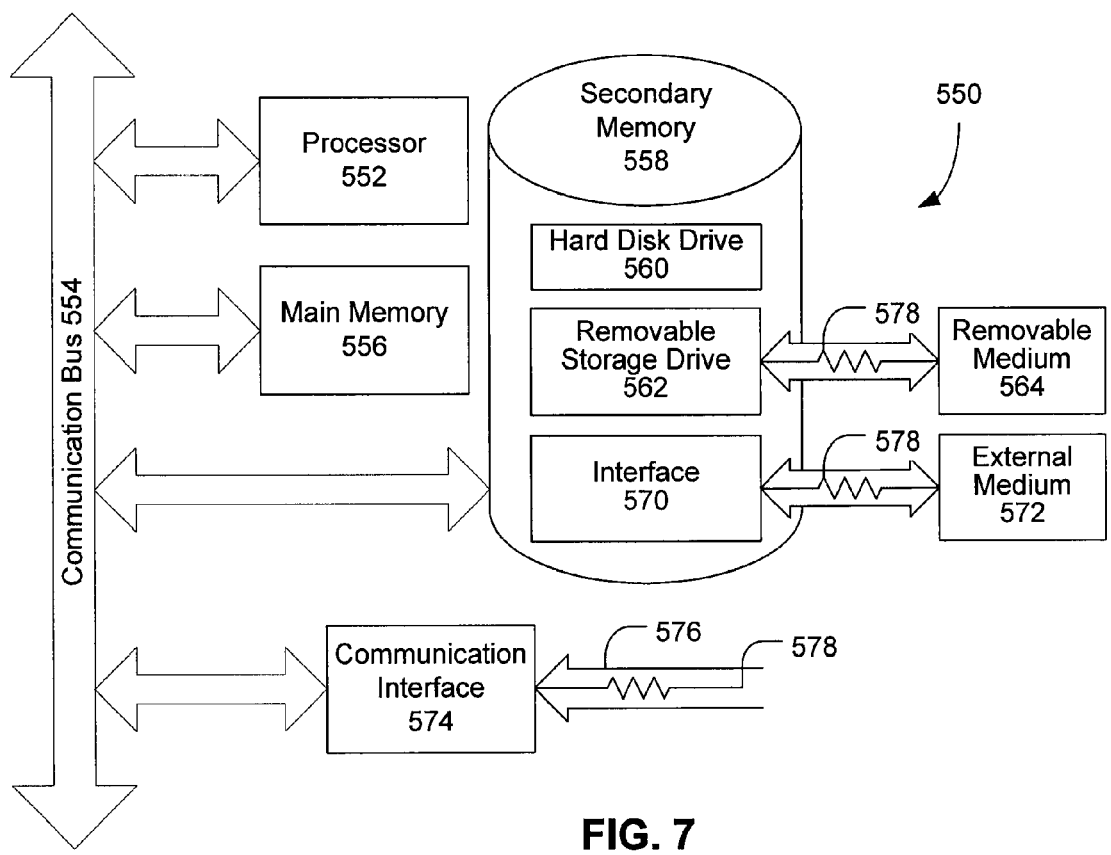
FIG. 7 is a block diagram illustrating an example computer system that may be used in connection with various embodiments described herein.

FIG. 7 is a step diagram illustrating an example computer system 550 that may be used in connection with various embodiments described herein. For example, the computer system 550 may be used in conjunction with the client device 20 or 30, and/or the symbol communication server 40 and/or web server 60 previously described with respect to FIG. 1. Other computer systems and/or architectures may also be used as will be understood by those skilled in the art.

The computer system 550 preferably includes one or more processors, such as processor 552. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 552.

The processor 552 is preferably connected to a communication bus 554. The communication bus 554 may include a data channel for facilitating information transfer between storage and other peripheral components of the computer system 550. The communication bus 554 further may provide a set of signals used for communication with the processor 552, including a data bus, address bus, and control bus (not shown). The communication bus 554 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

Computer system 550 preferably includes a main memory 556 and may also include a secondary memory 558. The main memory 556 provides storage of instructions and data for programs executing on the processor 552. The main memory 556 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 558 may optionally include a hard disk drive 560 and/or a removable storage drive 562, for example a floppy disk drive, a magnetic tape drive, a compact disc ("CD") drive, a digital versatile disc ("DVD") drive, etc. The removable storage drive 562 reads from and/or writes to a removable storage medium 564 in a well-known manner. Removable storage medium 564 may be, for example, a floppy disk, magnetic tape, CD, DVD, etc.

The removable storage medium 564 is preferably a computer readable medium having stored thereon computer executable code (i.e., software) and/or data. The computer software or data stored on the removable storage medium 564 is read into the computer system 550 as electrical communication signals 578.

In alternative embodiments, secondary memory 558 may include other similar means for allowing computer programs or other data or instructions to be loaded into the computer system 550. Such means may include, for example, an external storage medium 572 and an interface 570. Examples of external storage medium 572 may include an external hard disk drive or an external optical drive, or and external magneto-optical drive.

Other examples of secondary memory 558 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage units 572 and interfaces 570, which allow software and data to be transferred from the removable storage unit 572 to the computer system 550.

Computer system 550 may also include a communication interface 574. The communication interface 574 allows software and data to be transferred between computer system 550 and external devices (e.g. printers), networks, or information sources. For example, computer software or executable code may be transferred to computer system 550 from a network server via communication interface 574. Examples of communication interface 574 include a modem, a network interface card ("NIC"), a communications port, a PCMCIA slot and card, an infrared interface, and an IEEE 1394 fire-wire, just to name a few.

Communication interface 574 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 574 are generally in the form of electrical communication signals 578. These signals 578 are preferably provided to communication interface 574 via a communication channel 576. Communication channel 576 carries signals 578 and can be implemented using a variety of wired or wireless communication means including wire or cable, fiber optics, conventional phone line, cellular phone link, wireless data communication link, radio frequency (RF) link, or infrared link, just to name a few.

Computer executable code (i.e., computer programs or software) is stored in the main memory 556 and/or the secondary memory 558. Computer programs can also be received via communication interface 574 and stored in the main memory 556 and/or the secondary memory 558. Such computer programs, when executed, enable the computer system 550 to perform the various functions of the present invention as previously described.

In this description, the term "computer readable medium" is used to refer to any media used to provide computer executable code (e.g., software and computer programs) to the computer system 550. Examples of these media include main memory 556, secondary memory 558 (including hard disk drive 560, removable storage medium 564, and external storage medium 572), and any peripheral device communicatively coupled with communication interface 574 (including a network information server or other network device). These computer readable mediums are means for providing executable code, programming instructions, and software to the computer system 550.

In an embodiment that is implemented using software, the software may be stored on a computer readable medium and loaded into computer system 550 by way of removable storage drive 562, interface 570, or communication interface 574. In such an embodiment, the software is loaded into the computer system 550 in the form of electrical communication signals 578. The software, when executed by the processor 552, preferably causes the processor 552 to perform the inventive features and functions previously described herein.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

The invention claimed is:

1. A magnetic media drive for analyzing magnetic media surfaces for thermal erasures and other characteristics comprising:
   a drive channel module configured to measure gain control values for a magnetic media surface, the magnetic media surface having multiple positions where each position includes a servo wedge on which servo samples including a preamble signal is recorded on servo tracks of the magnetic media surface, the gain control values represent the amount of gain applied by the drive channel module to the preamble signal to acquire a desired amplitude;
   an acquisition module in communication with the drive channel module, the acquisition module configured to receive a request for measurement of gain control values for a magnetic media surface according to one or more measurement parameters indicating the scope of the measurement and acquiring the gain control values according to the measurement parameters;
   a configuration module configured to arrange the acquired gain control values in accordance with their proximity to each other and to organize the gain control values to generate one or more images that represent changes in the characteristics of the magnetic media surface;
   an analysis module configured to analyze the one or more images to detect patterns in the one or more images that represent a change in the characteristic of the magnetic media surface and to analyze the patterns to determine measurement values that coincide with the change in the characteristic of the magnetic media surface.

2. The magnetic media module of claim 1, wherein the measurement values are utilized to determine the root cause of the change in the characteristics of the magnetic media surface.

3. The magnetic media drive of claim 1, further comprising a filter module configured to filter the image generated to enhance subtle differences in the automatic gain control values that are used to generate the one or more image.

4. The magnetic media drive of claim 1, wherein the one or more measurement parameters including a geographic location on the magnetic media surface for which the measurement is required.

5. The magnetic media drive of claim 4, further comprising a comparative module configured to compare a current image of the one or more images with a prior image representing the same geographic location on the magnetic media surface as the current image to identify a change in the pattern of the current image with respect to that of the prior image.

6. The magnetic media drive of claim 5, wherein the comparative module is further configured to subtract the change in the pattern of a first image from the change in pattern of a second image to determine an incremental change in the image pattern, the first and second images acquired at different moments in time and both representing an image based on the automatic gain control values of a similar geographic location on the magnetic media surface.

7. The magnetic media drive of claim 6, wherein the incremental change represents a metric to track changes on the magnetic media surface.

8. The magnetic media module of claim 1, wherein the analysis module is further configured to analyze the one or more images to identify a change in the pattern of a current image with respect to that of one of a threshold image and a prior image, the current image, prior image and the threshold image representing the same geographic location.

9. The magnetic media module of claim 8, wherein the current image is generated periodically to determine a rate of change in the characteristics of the current image.

10. The magnetic media module of claim 8, wherein the analysis module is further configured to analyze the current image to detect a pattern in the current image that reveals information related to one of the head velocity and position of the head that corresponds to an occurrence of a change in the pattern of the current image with respect to one of the threshold image and the prior image.

11. The magnetic media module of claim 8, wherein the analysis module is further configured to analyze the one or more images to determine when a change in the characteristics of the current image with respect to one of a prior image and a threshold image has occurred.

12. The magnetic media drive of claim 1, wherein the measurement parameter includes a step size.

13. The magnetic media drive of claim 1, wherein the geographic location is defined by at least a portion of the multiple positions of the magnetic media surface.

14. The magnetic media drive of claim 1, wherein the geographic location is defined by a radius and a rotational angle on the magnetic media surface.

15. The magnetic media drive of claim 1, wherein the acquisition module is further configured to sum multiple samples of each servo wedge in each position requested.

16. A method for analyzing magnetic media surfaces for thermal erasures and other characteristics comprising:
   measuring gain control values for a magnetic media surface, the magnetic media surface having multiple positions where each position includes a servo wedge on which servo samples including a preamble signal is recorded on servo tracks of the magnetic media surface, the gain control values represent the amount of gain applied by a drive channel module to the preamble signal to acquire a desired amplitude;
   receiving a request for measurement of gain control values for a magnetic media surface according to one or more measurement parameters indicating the scope of the measurement and acquiring the gain control values according to the measurement parameters, the one or more measurement parameters including a geographic location on the magnetic media surface for which the measurement is required;
   arranging the acquired gain control values in accordance with their proximity to each other and organizing the gain control values to generate one or more images that represent changes in the characteristics of the magnetic media surface;
   analyzing the one or more images to detect patterns in the one or more images that represent at least a change in a characteristic of the magnetic media surface;
   analyzing the patterns to determine one or more measurement values that coincide with the change in the characteristic of the magnetic media surface, the one more measurement values utilized for detecting the root cause of the change in the characteristic of the magnetic media surface; and
   performing a responsive action including generating an error condition when the change in the characteristics of the magnetic media surface exceeds a threshold.

17. The method of claim 16, further comprising reporting the results of the measurement to a host device.

18. The method of claim 16, further comprising filtering the image generated to enhance subtle differences in the gain control values that are used to generate the one or more image.

19. The method of claim 16, further comprising comparing a current image of the one or more images with a prior image representing the same geographic location on the magnetic media surface as the current image to identify a change in the pattern of the current image with respect to that of the prior image.

20. The method of claim 19, further comprising subtracting the change in the pattern of a first image from the change in pattern of a second image to determine an incremental change in the image pattern, the first and second image acquired at different moments in time and representing an image based on the gain control values of a similar geographic location on the magnetic media surface.

21. The method of claim 20, wherein the geographic location is specified by a begin position and an end position.

22. The method of claim 16, further comprising analyzing the one or more images to identify a change in the pattern of a current image with respect to that of a threshold image, the current image and the threshold image representing the same geographic location.

23. The method of claim 22, further comprising analyzing the current image to detect a pattern in the current image that reveals measurement values related to one of a head velocity and position of the head that corresponds to an occurrence of a change in the pattern of the current image with respect to one of the threshold image and the prior image.

24. The method of claim 16, further comprising analyzing the one or more images to determine when a change in the characteristics of the current image with respect to one of a prior image and a threshold image has occurred.

25. A system for analyzing magnetic media surfaces for thermal erasures and other characteristics comprising:
 means for measuring gain control values for a magnetic media surface, the magnetic media surface having multiple positions where each position includes a servo wedge on which servo samples including a preamble signal is recorded on servo tracks of the magnetic media surface, the gain control values represent the amount of gain applied by a drive channel module to the preamble signal to acquire a desired amplitude;
 means for receiving a request for measurement of gain control values for a magnetic media surface according to one or more measurement parameters indicating the scope of the measurement and acquiring the gain control values according to the measurement parameters, the one or more measurement parameters including a geographic location on the magnetic media surface for which the measurement is required;
 means for arranging the acquired gain control values in accordance with their proximity to each other and organizing the gain control values to generate one or more images that represent changes in the characteristics of the magnetic media surface;
 means for analyzing the one or more images to detect patterns in the one or more images that represent at least a change in a characteristic of the magnetic media surface;
 means for analyzing the patterns to determine a measurement values that coincide with the change in the characteristic of the magnetic media surface, the measurement values utilized for detecting the root cause of the change in the characteristic of the magnetic media surface; and
 means for performing a responsive action including generating an error condition when the change in the characteristics of the magnetic media surface exceeds a threshold.

26. The system for analyzing magnetic media surfaces of claim 25, further comprising a means for receiving the request from a host device to measure the gain control values of the magnetic media surface.

27. The system for analyzing magnetic media surfaces of claim 25, further comprising a means for reporting the results of the measurement to the host device.

28. The system for analyzing magnetic media surfaces of claim 25, further comprising a means for filtering the image generated to enhance subtle differences in the gain control values that are used to generate the one or more image.

29. The system for analyzing magnetic media surfaces of claim 25, further comprising a means for comparing a current image of the one or more images with a prior image representing the same geographic location on the magnetic media surface as the current image to identify a change in the pattern of the current image with respect to that of the prior image.

30. The system for analyzing magnetic media surfaces of claim 29, further comprising a means for subtracting the change in the pattern of a first image from the change in pattern of a second image to determine an incremental change in the image pattern, the first and second image acquired at different moments in time and representing an image based on the gain control values of a similar geographic location on the magnetic media surface.

31. The system for analyzing magnetic media surfaces of claim 25, further comprising a means for analyzing the one or more images to identify a change in the pattern of a current image with respect to that of a threshold image, the current image and the threshold image representing the same geographic location.

32. The system for analyzing magnetic media surfaces of claim 25, further comprising a means for analyzing the current image to detect a pattern in the current image that reveals information related to one of the head velocity and position of the head that corresponds to an occurrence of a change in the pattern of the current image with respect to one of the threshold image and the prior image.

33. The system for analyzing magnetic media surfaces of claim 25, further comprising a means for analyzing the one or more images to determine when a change in the characteristics of the current image with respect to one of a prior image and a threshold image has occurred.

* * * * *